US009253562B2

(12) United States Patent
Ludwig

(10) Patent No.: US 9,253,562 B2

(45) Date of Patent: Feb. 2, 2016

(54) VEHICLE LOUDSPEAKER MODULE

(75) Inventor: Christopher Ludwig, White Lake, MI (US)

(73) Assignee: Bose Corporation, Framingham, MA (US)

( * ) Notice: Subject to any disclaimer, the term of this patent is extended or adjusted under 35 U.S.C. 154(b) by 899 days.

(21) Appl. No.: 13/437,054

(22) Filed: Apr. 2, 2012

(65) Prior Publication Data

US 2013/0259258 A1 Oct. 3, 2013

(51) Int. Cl.

| | |
|---|---|
| ***H04B 1/00*** | (2006.01) |
| ***H04R 1/20*** | (2006.01) |
| ***H04R 1/02*** | (2006.01) |
| ***H04R 1/28*** | (2006.01) |
| ***H04R 1/32*** | (2006.01) |

(52) U.S. Cl.

CPC ................ *H04R 1/2819* (2013.01); *H04R 1/02* (2013.01); *H04R 1/2834* (2013.01); *H04R 1/323* (2013.01); *H04R 2201/02* (2013.01); *H04R 2499/13* (2013.01)

(58) Field of Classification Search

CPC .. B60R 11/0217; H04R 1/025; H04R 1/2815; H04R 2499/13; H04R 2201/02; H04R 1/323; H04R 1/2819; H04R 1/02; H04R 1/2834

USPC .................................... 381/86, 338, 349, 389

See application file for complete search history.

(56) References Cited

U.S. PATENT DOCUMENTS

| | | | | |
|---|---|---|---|---|
| 4,593,405 | A * | 6/1986 | Frye et al. | 381/99 |
| 4,866,776 | A * | 9/1989 | Kasai et al. | 381/302 |
| 5,664,020 | A | 9/1997 | Goldfarb et al. | |
| 5,850,460 | A * | 12/1998 | Tanaka et al. | 381/186 |
| 7,133,533 | B2 | 11/2006 | Chick et al. | |
| 2005/0018868 | A1 * | 1/2005 | Chick et al. | 381/349 |

OTHER PUBLICATIONS

International Search Report and Written Opinion dated Jun. 18, 2013 for International application No. PCT/US2013/034771.

International Preliminary Report on Patentability dated Oct. 16, 2014 for International application No. PCT/US2013/034771.

* cited by examiner

*Primary Examiner* — Vivian Chin

*Assistant Examiner* — Douglas Suthers

(74) *Attorney, Agent, or Firm* — Bose Corporation

(57) ABSTRACT

An audio module for use in a vehicle cabin. An elongated substantially sealed enclosure has two ends in the lengthwise direction. A first acoustic driver is mounted in the enclosure near one end of the enclosure for radiating acoustic energy from the end of the enclosure. A second acoustic driver is mounted in the enclosure near a second end of the enclosure for radiating acoustic energy from the second end of the enclosure. The audio module includes a bass augmenting device for radiating low frequency acoustic energy from the enclosure. The audio module is constructed and arranged to be pre-assembled so that the audio module can be installed in the vehicle as a single assembly. The audio module is configured to be mounted to the vehicle so that the lengthwise direction is substantially vertical with the first end of the enclosure higher than the second end of the enclosure.

14 Claims, 3 Drawing Sheets

Side View (all four sides are identical)

VEHICLE LOUDSPEAKER MODULE

BACKGROUND

This specification describes a loudspeaker device that is a component of an audio system for a vehicle, such as a passenger vehicle or truck, or some other vehicle with a cabin, such as a construction vehicle, a farm vehicle, a military vehicle, or the like. Audio systems for vehicles typically include speakers positioned about the vehicle cabin, in locations such as the doors, the parcel shelves, the pillars, or the like. The audio signals for the speakers are typically equalized and amplified for each speaker and conducted to the individual speakers through wiring harnesses.

SUMMARY

In one aspect, an apparatus includes an audio module for use in a vehicle cabin. The audio module includes an elongated substantially sealed enclosure having two ends in the lengthwise direction; a first acoustic driver mounted in the enclosure near one end of the enclosure for radiating acoustic energy from the one end of the enclosure; a second acoustic driver mounted in the enclosure near a second end of the enclosure for radiating acoustic energy from the second end of the enclosure; a bass augmenting for radiating low frequency acoustic energy from the enclosure. The audio module is constructed and arranged to be pre-assembled so that the audio module can be installed in the vehicle as a single assembly. The audio module is configured to be mounted to the vehicle so that the lengthwise direction is substantially vertical with the first end of the enclosure higher than the second end of the enclosure. The audio module may be configured to be mounted to an instrument panel of the vehicle so that the first acoustic driver radiates acoustic energy from an upper surface of the instrument panel, and so that the second acoustic driver and the bass augmenting device radiate acoustic energy from a lower surface of the instrument panel. The bass augmenting device comprises a plurality of passive radiators each including a passive radiator diaphragm. The passive radiators mounted in openings in the acoustic enclosure so that in operation, the inertial forces of the passive radiator diaphragms cancel. The volume of the elongated substantially sealed enclosure is greater than 1.5 liters and the first acoustic driver and the second acoustic driver are separated by at least 200 mm. The first acoustic driver and the second acoustic driver may be substantially full range acoustic drivers and the bass augmenting device may radiate acoustic energy below 100 Hz. The apparatus may further include a single receptacle for connection with a single wiring harness. The radiating element of the bass augmenting device may be closer to the second end of the enclosure than to the first end of the enclosure. The vehicle cabin may be configured so that there is an acoustic null of radiation from the first acoustic driver at a predetermined position in the vehicle cabin in a predetermined frequency range. The apparatus may include circuitry to cause the second acoustic driver to radiate in the predetermined frequency range and to roll off radiation from the second acoustic driver above and below the frequency range. The first end and the second end may be planar and the plane of the first end and the plane of the second end may be parallel or non-parallel.

In another aspect, an audio system for an automobile includes an acoustic module including an elongated substantially sealed enclosure having two ends in the lengthwise direction; a first acoustic driver mounted in one of the ends; a second acoustic driver mounted in the second end; and a first bass augmenting for radiating low frequency acoustic energy from the enclosure, mounted in the side of the enclosure, mounted near the second end. The acoustic module may be mounted in a vehicle cabin so that the first end faces substantially vertically upward from the upper surface on an instrument panel and the second end may face vertically downward into the footwell of the vehicle. The bass augmenting device may include a plurality of passive radiators each including a passive radiator diaphragm. The radiators may be mounted in openings in the acoustic enclosure so that in operation, the inertial forces of the passive radiator diaphragms cancel. The elongated enclosure may be substantially sealed and the volume of the substantially sealed enclosure may be greater than 2 liters and the first acoustic driver and the second acoustic driver may be separated by at least 300 mm. The first acoustic driver and the second acoustic driver may be substantially full range acoustic drivers. The bass augmenting device are passive radiators tuned to 55 Hz. The apparatus may further include a single receptacle for connection with a single wiring harness. The radiating element of the bass augmenting device may be closer to the second end of the enclosure than to the first end of the enclosure. The vehicle cabin may be configured so that there is an acoustic null of radiation from the first acoustic driver at a predetermined position in the vehicle cabin in a predetermined frequency range. The apparatus may include circuitry to cause the second acoustic driver to radiate in the predetermined frequency range and to roll off radiation from the second acoustic driver above and below the frequency range.

In another aspect, a method includes radiating, from the top of an instrument panel of a vehicle, acoustic energy from a first acoustic driver mounted near the end of an enclosure; radiating, into the footwell of the vehicle, acoustic energy from a second acoustic driver mounted near a second end of the enclosure; radiating, into the footwell of the vehicle, acoustic energy from a bass augmenting device mounted near the second end. The enclosure may be in the form of a rectangular prism, and the length of one edge of the prism may be more than four times the length of any other edge of the prism. The bass augmenting device may be a passive radiator. The vehicle cabin may be configured so that there is an acoustic null of radiation from the first acoustic driver at a predetermined position in the vehicle cabin in a predetermined frequency range, and the radiating into the footwell may include radiating in the predetermined frequency range and rolling off radiation from the second acoustic driver above and below the predetermined frequency range.

Other features, objects, and advantages will become apparent from the following detailed description, when read in connection with the following drawing, in which:

DETAILED DESCRIPTION

Figure 2B:
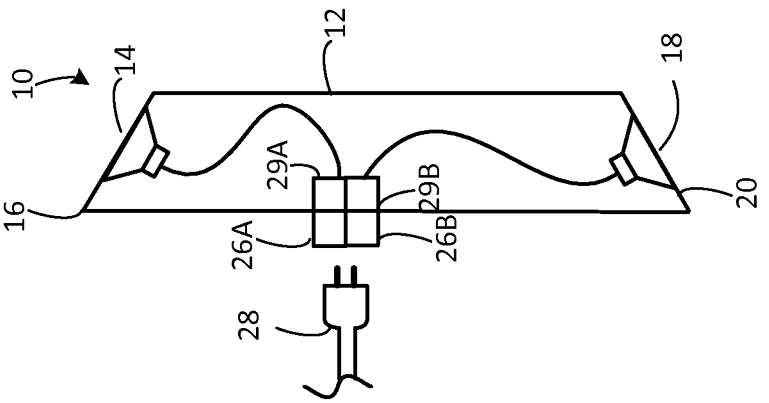
FIGS. 2A and 2B are diagrammatic views of a loudspeaker module showing the internal wiring of the module.

Though the elements of several views of the drawing may be shown and described as discrete elements in a block diagram and may be referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Operations may be performed by analog circuitry or by a microprocessor executing software that performs the mathematical or logical equivalent to the analog operation. Unless otherwise indicated, signal lines may be implemented as discrete analog or digital signal lines, as a single discrete digital signal line with appropriate signal processing to process separate streams of audio signals, or as elements of a wireless communication system. Some of the processes may be described in block diagrams. The activities that are performed in each block may be performed by one element or by a plurality of elements, and may be separated in time. The elements that perform the activities of a block may be physically separated. Unless otherwise indicated, audio signals or video signals or both may be encoded and transmitted in either digital or analog form; conventional digital-to-analog or analog-to-digital converters may not be shown in the figures.

Vehicle cabins present challenges to designers of audio reproduction systems. It may be difficult to place speakers in optimum positions so, for example, each speaker may be significantly closer to one listening location that another location; the positioning of speakers and the large amount of reflective surface (windshields, windows etc.) may cause "hotspots" and nulls in the vehicle cabin; acoustic radiation, particularly at high amplitudes and low frequencies may result in mechanical vibration, resulting in buzzes and rattles; some speaker locations, for example doors, may be exposed environmentally, for example to moisture, detergents, and the like; and openings in acoustic devices may allow entry of debris into the enclosure.

Figure 1B:
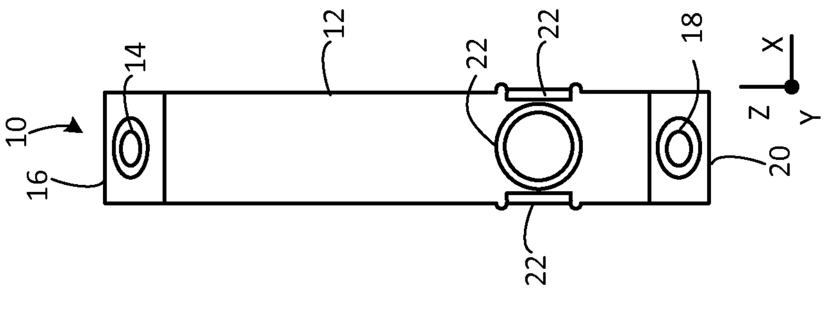
FIGS. 1A and 1B are diagrammatic views of a loudspeaker module.
Figure 1A:
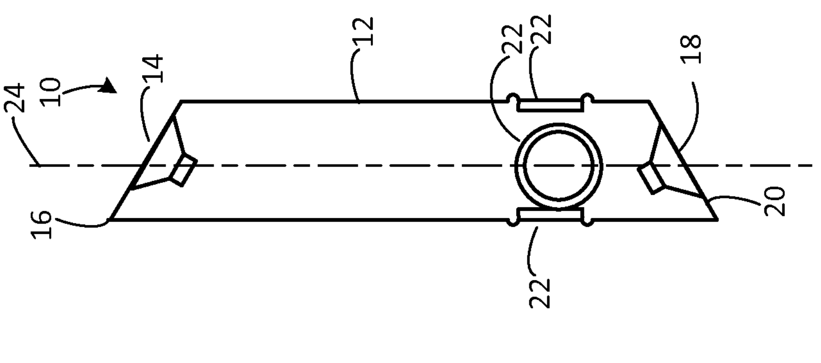

FIGS. 1A and 1B, show, respectively, a side view and a front view of an acoustic module 10 for use in a vehicle. The module includes an elongated enclosure 12; a first acoustic driver 14, mounted in an opening in the enclosure proximate the top 16 of the enclosure; a second acoustic driver 18, mounted in an opening in the enclosure proximate the bottom 20 of the enclosure; and one or more bass augmenting devices 22, for example passive radiators, mounted in openings in the enclosure, for example near the bottom 20 of the enclosure. Passive radiators may be positioned so that when in operation, the inertial forces of the passive radiators cancel. The enclosure is sealed, or in some implementations substantially sealed except for a port opening or a waveguide exit, if the module includes a port or a waveguide.

Figure 2A:
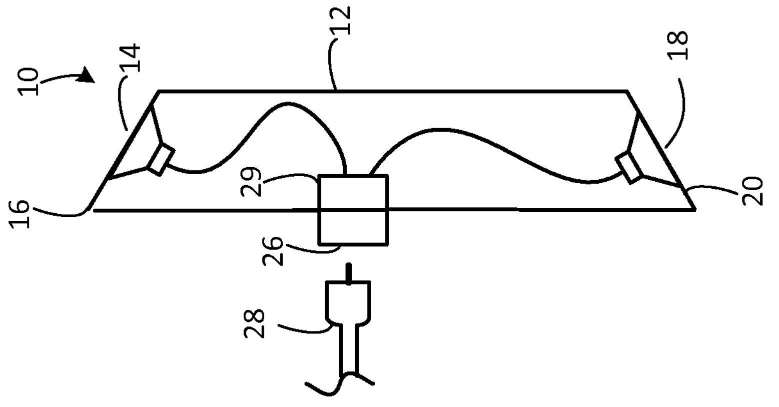

FIGS. 2A and 2B show alternate wiring and signal processing configurations. The configuration of FIG. 2A includes a receptacle 26 for a wiring harness 28. The receptacle is internally wired to the acoustic drivers 14 and 18 through signal processing circuitry 29 so that the same signal is provided to acoustic drivers 14 and 18. The configuration of FIG. 2B provides for two different signals (for example two different channels of a multichannel system or signals from different sources, for example a vehicle navigation system and a vehicle entertainment system). The configuration of FIG. 2B includes a first receptacle 26A and a second receptacle 26B, and separate signal processing circuitries 29A and 29B, so that the two acoustic drivers may receive audio signals from different sources, processed differently. Other implementations could include other combinations of audio signal and audio signal processing. For example, the two acoustic drivers could receive an audio signal from the same source, but processed different. Processing can include filtering, roll-off, equalization, spectral shaping, phase shifting, delay, and the like.

Figure 3:
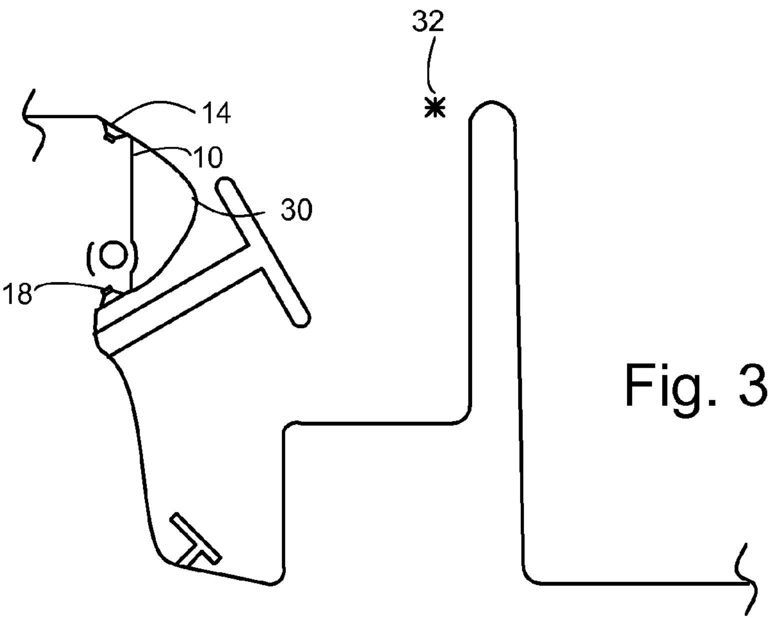
FIG. 3 is a diagrammatic view of an vehicle cabin.

For simplicity, the enclosure is shown with planar sides, top, and bottom; with a square cross section in the X-Y plane; and with a straight centerline 24 (FIG. 1A) in the direction of elongation. The module is intended for use in a vehicle cabin, for example as shown in FIG. 3, mounted so that one acoustic driver 14 faces generally upwardly from the instrument panel; and a second acoustic driver 18 faces generally downward from the instrument panel toward the floor in the footwell area. The passive radiators are positioned low in the enclosure so that the sound waves are radiated into the footwell, toward the floor, or behind the instrument panel. It typically is not a serious problem if the acoustic path between the passive radiators and the listening area is partially blocked by structure, such as the instrument panel because the passive radiators radiate low frequency acoustic energy.

In order to fit into the desired location, the geometry of actual implementations may differ from the simplified view of FIGS. 1A and 1B. For example, one or both of the acoustic drivers 14 and 18 may be mounted in a side of the enclosure rather than in the top or bottom. The centerline in the direction of elongation may not be straight. The cross section in the X-Y plane may circular, elliptical, or irregular and may vary in the Z-direction. The top 16 and bottom 20 may be non-planar and may be slanted relative to the sides as shown or may be horizontal to mate with the instrument panel. Passive radiators are desirable for the bass augmenting devices 22 because they seal the enclosure 12, but the bass augmenting devices could also be, for example, ports or waveguides, optionally with the port or waveguide entrance covered by a protective, acoustically transparent material, for example fabric, wire mesh, or perforated metal panels.

While the geometry of the module may be customized to fit into individual car models, a desirable predictability of performance can be achieved by standardizing some components, for example, the acoustic drivers, the passive radiators, and the material from which the enclosure is made. Some dimensions can be standardized, for example the volume enclosed by the enclosure, the volume and cross-sectional area of a port, the length of a waveguide, the dimensions and mass of a passive radiator diaphragm, or the tuning frequency of a port, waveguide, or passive radiator. Generally, the parameters that control acoustic performance can be standardized, while the geometries and dimensions that must be varied to fit into a vehicle cabin do not affect acoustic performance.

FIG. 3 shows a loudspeaker module designed to be positioned in the instrument panel 30 of a vehicle as shown. In one simple implementation, the first acoustic driver 14 alone may provide an adequate sound pressure level, but the configuration of the vehicle may result in a null in radiation from acoustic driver 14 at about 90-120 Hz at a listening location, for example a position 32 near the normal position of the head of an occupant of the driver's seat of the vehicle and at other listening locations in the vehicle. The second acoustic driver 18 could radiate 90-120 Hz and rolled off above and below 90-120 Hz. In a more complex implementation, signal processing such as filtering, equalization, spectral shaping, phase shifting, delay and the like may be employed to achieve a more spacious effect. Different frequency bands could be treated differently, for example frequencies in the speech band could be provided with a less spacious effect than frequencies outside the speech band. In another example, second acoustic driver 18 could be used only below a cutoff frequency so that only acoustic driver 14 alone radiates high frequencies, the combination of acoustic drivers 14 and 18 radiates mid-range frequencies, and the combination of acoustic drivers 14 and 18 and passive radiators 22 radiates low frequencies.

An acoustic module according to the previous figures has many advantages over conventional vehicle audio systems. The modules can radiate full range audio, eliminating the need for crossover networks, separate tweeters and woofers, and speakers in doors. Installing the full range module can be done in simple steps, one operation for a full range module as opposed to separate operations for woofers and tweeters. The two acoustic drivers provide two drive points, one above the instrument panel and one under the instrument panels which makes the acoustic system less prone to nulls that occur in vehicle cabins due to geometry, configuration, reflective surfaces, placement of acoustic drivers, and other factors. Placement of the bass augmenting devices near the bottom end of the enclosure desirably radiates bass frequencies near the vehicle floor. The internal (to the module) conductors permit electrical connection to two acoustic drivers through a single wiring harness 28. Conventional full range systems require a wire harness for each acoustic driver and conventional two-way audio systems may require a wire harness for each speaker for a total of four connections instead of the one required in the module of FIGS. 1A-1C and 3.

The audio module of the previous figures can also be adapted for use in other locations of a vehicle cabin. For example, a module may be configured to fit in the rear of the vehicle cabin so that the acoustic driver at one end of enclosure faces upwardly from the parcel shelf, so that the acoustic driver in the second end of the enclosure faces the passenger compartment at a location lower than the first acoustic driver, and the passive radiators radiate low frequencies into the trunk. As with the implementation configured to be used in the front of the vehicle, the rear seat implementation can be custom shaped for the vehicle, but the components, the dimensions and tuning frequency of passive radiators and the volume of the enclosure can be standardized so that the modules have substantially the same acoustic characteristics as the module of FIG. 3. Or if desired, the components and the enclosure volume of the implementation of FIG. 3 may be different from the acoustic characteristics.

Figure 4:
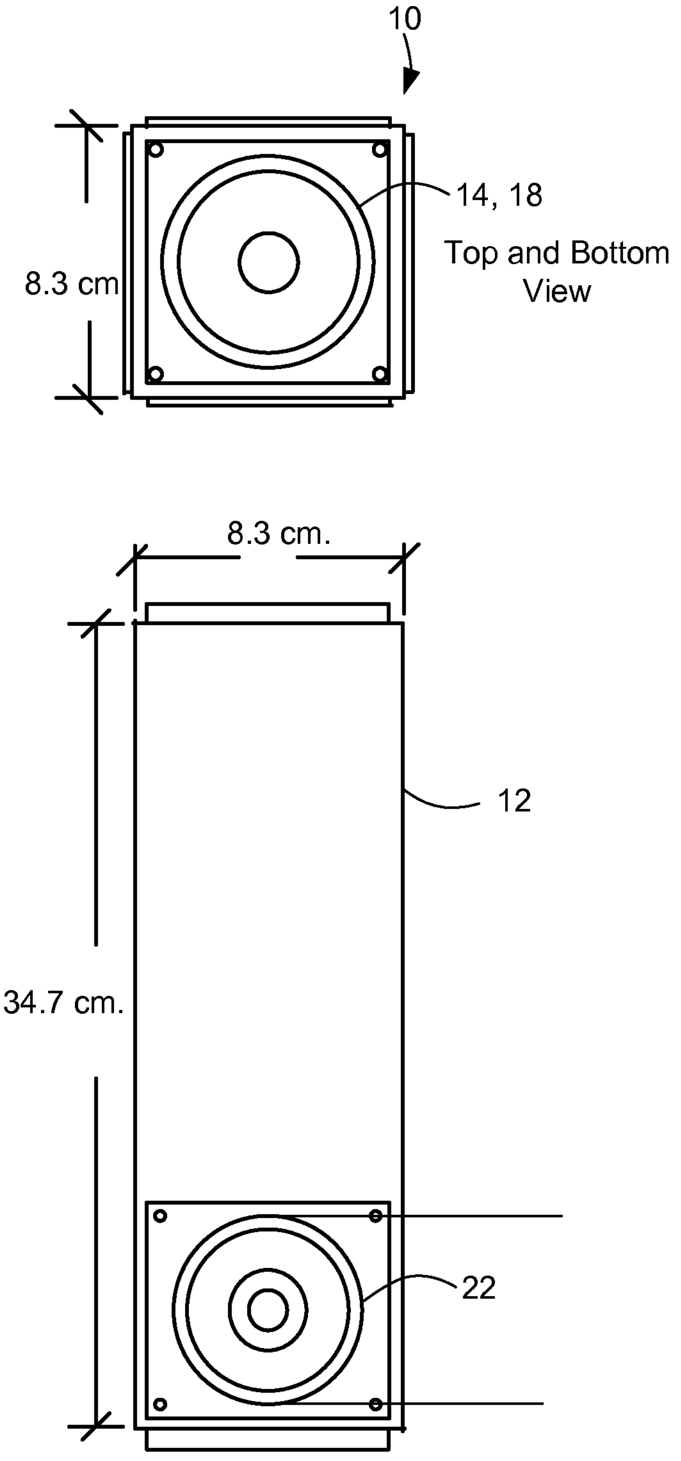
FIG. 4 includes plan view of an implementation of a loudspeaker module.

FIG. 4 shows a prototype of an actual prototype. Reference numbers correspond to like numbered elements in the previous figures. In the prototype, the enclosure 12 is made of a melamine resin in the form of a rectangular prism with dimensions 8.3 cm,×8.3 cm×34.7 cm, for a total; volume of about 2.4 liters. The sides may be secured with some combination of fasteners and adhesive. A sealant, such as an epoxy resin may be applied to the joints for sealing and added stability. Acoustic drivers 14 and passive radiators 22 may be secured to the enclosure by screws and sealed with a conformable material such as putty. In one embodiment, the acoustic drivers may be 50 mm nominal full range drivers. The passive radiators are diaphragms similar to the acoustic driver diaphragms, with the mass of the diaphragm adjusted to tune the passive radiator to 55 Hz.

Figure 5:
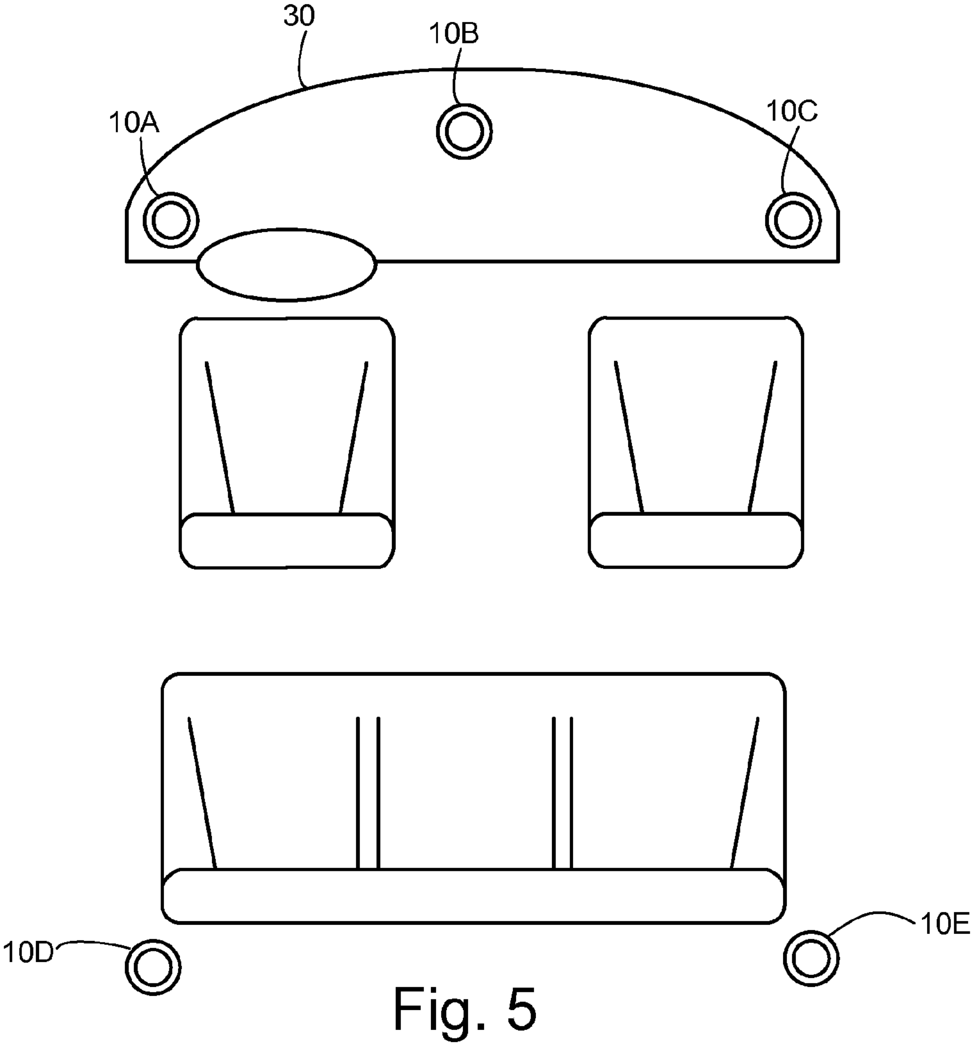
FIG. 5 is a diagrammatic view of a vehicle cabin.

FIG. 5 shows an example of an audio system for a vehicle using acoustic modules shown in preceding figures. In the audio system of FIG. 5, there are three modules 10A, 10B, and 10C mounted in the instrument panel in the manner shown in FIG. 2. There are two modules 10D and 10E at the two sides of the rear seat, mounted to that one acoustic driver faces upwardly.

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

1. Apparatus comprising:

an audio module for use in a vehicle cabin, comprising:

an elongated substantially sealed enclosure having two ends in the lengthwise direction;

a first acoustic driver mounted in the enclosure near one end of the enclosure for radiating acoustic energy from the one end of the enclosure;

a second acoustic driver mounted in the enclosure near a second end of the enclosure for radiating acoustic energy from the second end of the enclosure; and a bass augmenting device for radiating low frequency acoustic energy from the enclosure, wherein the audio module is constructed and arranged to be pre-assembled so that the audio module can be installed in the vehicle as a single assembly, wherein the audio module is configured to be mounted to the vehicle so that the lengthwise direction is substantially vertical with the first end of the enclosure higher than the second end of the enclosure, wherein the bass augmenting device is closer to the second end of the enclosure than to the first end of the enclosure, wherein the vehicle cabin is configured so that there is an acoustic null of radiation from the first acoustic driver at a predetermined position in the vehicle cabin in a predetermined frequency range, the apparatus comprising circuitry to cause the second acoustic driver to radiate in the predetermined frequency range and to roll off radiation from the second acoustic driver above and below the frequency range, and wherein the first acoustic driver and the second acoustic driver are substantially full range acoustic drivers, and wherein the frequency range of the acoustic null is at about 90 Hz to about 120 Hz.

2. The apparatus of claim 1, wherein the audio module is configured to be mounted to an instrument panel of the vehicle so that the first acoustic driver radiates acoustic energy from an upper surface of the instrument panel, and so that the second acoustic driver and the bass augmenting device radiate acoustic energy from a lower surface of the instrument panel.

3. The apparatus of claim 1, wherein the bass augmenting device comprises a plurality of passive radiators each including a passive radiator diaphragm, the passive radiators mounted in openings in the acoustic enclosure so that in operation, the inertial forces of the passive radiator diaphragms cancel.

4. The apparatus of claim 1, wherein the volume of the elongated substantially sealed enclosure is greater than 1.5 liters and wherein the first acoustic driver and the second acoustic driver are separated by at least 200 mm.

5. The apparatus of claim 1, wherein the first acoustic driver and the second acoustic driver are substantially full range acoustic drivers and wherein the bass augmenting device radiates acoustic energy below 100 Hz.

6. The apparatus of claim 1, further comprising a single receptacle for connection with a single wiring harness.

7. The apparatus of claim 1, wherein the first end and the second end are planar and wherein the plane of the first end and the plane of the second end are parallel.

8. The apparatus of claim 1, wherein the first end and the second end are planar and wherein the plane of the first end and the plane of the second end are non-parallel.

9. An audio system for an automobile, comprising:
an acoustic module, comprising
an elongated substantially sealed enclosure having two ends in the lengthwise direction;
a first acoustic driver mounted in one of the ends;
a second acoustic driver mounted in the second end; and
a first bass augmenting for radiating low frequency acoustic enemy from the enclosure, mounted in a side of the enclosure between the two opposing ends, mounted near the second end,
wherein the acoustic module is mounted in a vehicle cabin so that the first end faces substantially vertically upward from the upper surface on an instrument panel, and wherein the second end faces vertically downward into a footwell of the vehicle,
wherein the first bass augmenting device is closer to the second end of the enclosure than to the first end of the enclosure,
wherein the vehicle cabin is configured so that there is an acoustic null of radiation from the first acoustic driver at a predetermined position in the vehicle cabin in a predetermined frequency range, the apparatus comprising circuitry to cause the second acoustic driver to radiate in the predetermined frequency range and to roll off radiation from the second acoustic driver above and below the frequency range, and
wherein the first acoustic driver and the second acoustic driver are substantially full range acoustic drivers, and wherein the frequency range of the acoustic null is at about 90 Hz to about 120 Hz.

10. The audio system of claim 9, wherein the elongated enclosure is substantially sealed and the volume of the substantially sealed enclosure is greater than 2 liters and wherein the first acoustic driver and the second acoustic driver are separated by at least 300 mm.

11. The audio system of 9, wherein the first acoustic driver and the second acoustic driver are substantially full range acoustic drivers and wherein the bass augmenting device are passive radiators tuned to 55 Hz.

12. The audio system of claim 9, further comprising a single receptacle for connection with a single wiring harness.

13. A method, comprising:
radiating, from the top of an instrument panel in a vehicle cabin, acoustic enemy from a first acoustic driver mounted near the end of an enclosure;
radiating, into a footwell of the vehicle, acoustic enemy from a second acoustic driver mounted near a second end of the enclosure; and
radiating, into the footwell of the vehicle, acoustic enemy from a bass augmenting device mounted near the second end,
wherein the vehicle cabin is configured so that there is an acoustic null of radiation from the first acoustic driver at a predetermined position in the vehicle cabin in a predetermined frequency range, the radiating into the footwell comprising radiating in the predetermined frequency range and rolling off radiation from the second acoustic driver above and below the predetermined frequency range, and
wherein the first acoustic driver and the second acoustic driver are substantially full range acoustic drivers, and wherein the frequency range of the acoustic null is at about 90 Hz to about 120 Hz.

14. The method of claim 13, wherein the bass augmenting device comprises a passive radiator.

* * * * *